May 16, 1972  R. L. BANKS  3,663,640
CONVERSION OF OLEFINIC HYDROCARBONS
Original Filed April 3, 1967
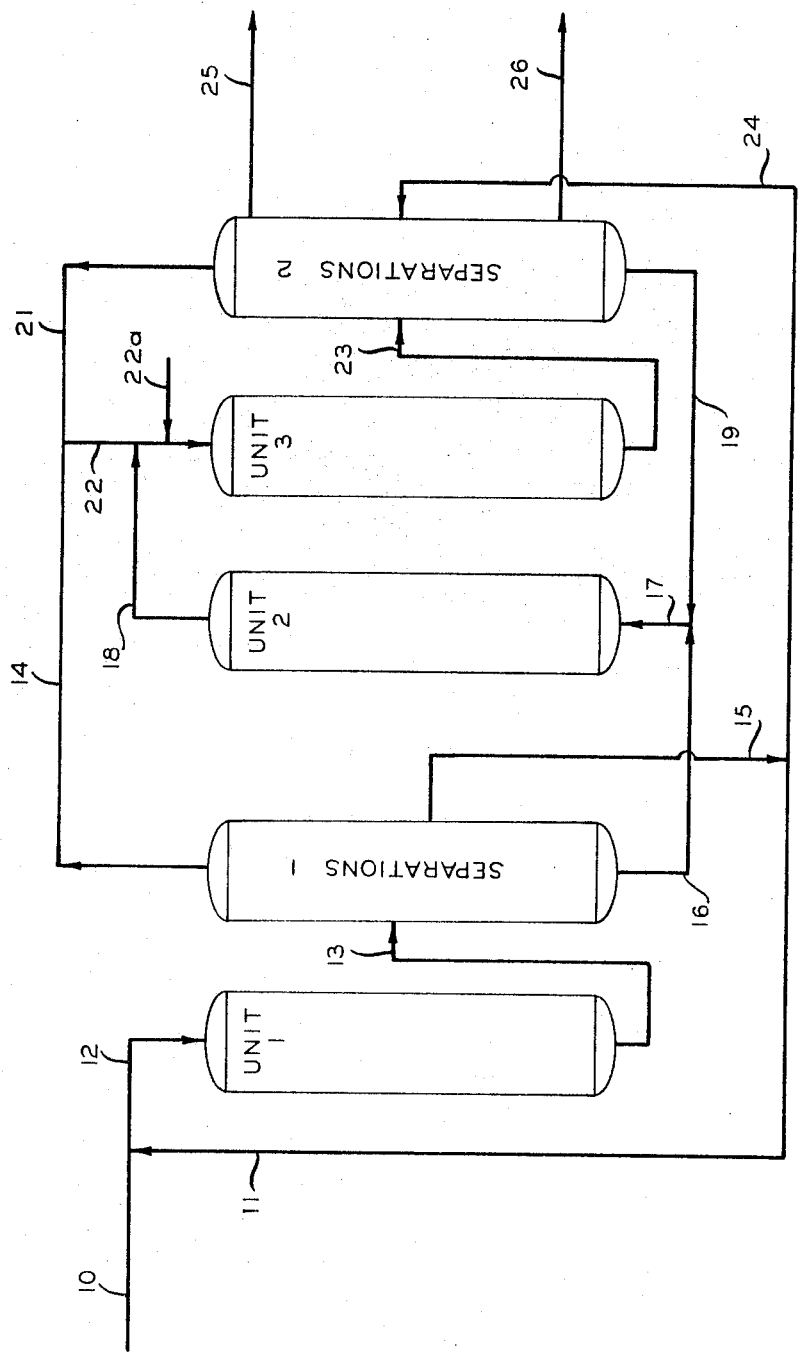
INVENTOR.
R. L. BANKS
BY
*Young & Quigg*
ATTORNEYS

3,663,640
CONVERSION OF OLEFINIC HYDROCARBONS
Robert L. Banks, Bartlesville, Okla., assignor to
Phillips Petroleum Company
Continuation of application Ser. No. 627,724, Apr. 3,
1967. This application Sept. 17, 1969, Ser. No. 858,736
Int. Cl. C07c *3/62, 11/18*
U.S. Cl. 260—680 R                    6 Claims

ABSTRACT OF THE DISCLOSURE

A mixture of isobutene and an olefinic hydrocarbon containing four carbon atoms per molecule and having a double bond in the 1-position is contacted with a catalyst, active for disproportionating propylene into ethylene and butene, to produce ethylene and branched olefinic hydrocarbons having six carbon atoms per molecule which are isomerized to produce an approximately equilibrium mixture of isomers. The mixture of isomers is contacted with a catalyst, active for disproportionating propylene into ethylene and butene, to produce an olefinic hydrocarbon having 5 carbon atoms per molecule. When the olefin having the double bond in the 1-position is 1-butene the 5-carbon olefin is 3-methylbutene-1 and when the olefin having the double bond in the 1-position is 1,3-butadiene the 5-carbon olefin is isoprene.

---

This is a continuation of application Ser. No. 627,724, filed Apr. 3, 1967 and now abandoned.

This invention relates to the conversion of a mixture of olefinic hydrocarbons to produce other olefinic hydrocarbons. In one aspect this invention relates to the conversion of a mixture of olefinic hydrocarbons in the presence of a catalyst which is active for the disproportionation of propylene into ethylene and butene. In still another aspect this invention relates to the conversion of a mixture of isobutylene and an olefinic hydrocarbon containing four carbon atoms per molecule and having a double bond in the 1-position into olefinic hydrocarbons containing five carbon atoms per molecule. Still another aspect of this invention relates to the production of 3-methylbutene-1 or isoprene by the olefin reaction.

The olefin reaction is defined as a process for the catalytic conversion over a catalyst of feed comprising one or more ethylenically unsaturated compounds to produce a resulting product which contains at least ten percent by weight of product compounds, which product compounds can be visualized as resulting from at least one primary reaction, as defined below, or the combination of at least one primary reaction and at least one unsaturated bond isomerization reaction, and wherein the sum of the compounds contained in said resulting product consisting of hydrogen, saturated hydrocarbons, and compounds which can be visualized as formed by skeletal isomerization but which cannot be visualized as formed by one or more of the above noted reactions, comprises less than twenty-five percent by weight of the total of said resulting product. Feed components and unsaturated bond isomers thereof are not included in the resulting product for the purpose of determining the above-noted percentages.

In the olefin reaction, as defined above, the primary reaction is a reaction which can be visualized as comprising the breaking of two existing unsaturated bonds between first and second carbon atoms and between third and fourth carbon atoms, respectively, and the formation of two new unsaturated bonds between said first and third and between said second and fourth carbon atoms. Said first and second carbon atoms and said third and fourth carbon atoms can be in the same or different molecules.

The olefin reaction according to this invention is illustrated by the following reactions:

(1) The disproportionation of an acyclic mono- or polyene having at least three carbon atoms into other acyclic mono- or polyenes of both higher and lower number of carbon atoms; for example, the disproportionation of propylene yields ethylene and butenes; the disproportionation of 1,5-hexadiene yields ethylene and 1,5,9-decatriene;

(2) The conversion of an acyclic mono- or polyene having three or more carbon atoms and a different acyclic mono- or polyene having three or more carbon atoms to produce different acyclic olefins; for example, the conversion of propylene and isobutylene yields ethylene and isopentene.

It is an object of the present invention to provide a method for producing 3-methylbutene-1 or isoprene from olefinic hydrocarbons containing four carbon atoms per molecule. It is also an object of this invention to provide a method for producing 3-methylbutene-1 from a mixture of butene-1 and isobutene. Still another object of this invention is to provide a method for producing isoprene from a mixture of butadiene-1,3 and isobutene. A further object of this invention is to provide a method for contacting a mixture of isobutene and an olefinic hydrocarbon containing four carbon atoms per molecule and having a double bond in the 1-position with a catalyst which is active for the disproportionation of propylene into ethylene and butene and with an isomerization catalyst so as to produce an olefinic hydrocarbon containing five carbon atoms per molecule. Other aspects, objects and advantages of this invention will become apparent to one skilled in the art upon studying this disclosure including the detailed description of the invention and the appended drawing wherein:

The sole figure is a schematic flow diagram of a preferred embodiment of the invention.

According to this invention a mixture of isobutylene and an olefinic hydrocarbon containing four carbon atoms per molecule and having a double bond in the 1-position is contacted with a catalyst, active for disproportionating propylene into ethylene and butene, to produce ethylene and branched chain olefinic hydrocarbons having six carbon atoms per molecule. The branched chain, six-carbon atom olefinic hydrocarbons are isomerized to produce an approximately equilibrium mixture of isomers. The mixture of isomers and ethylene is then contacted with a catalyst, active for disproportionating propylene into ethylene and butene, to produce an olefinic hydrocarbon containing five carbon atoms per molecule. Propylene is produced as a by-product. Olefinic hydrocarbons having four carbon atoms per molecule are returned to the feed and olefinic hydrocarbons having six carbon atoms per molecule are returned to the isomerization step. The ethylene produced in the first reaction step is utilized in the second reaction step following the isomerization step.

A wide variety of isomerization catalyts can be used in the isomerization step. Preferred catalysts are those which have little or no polymerization or cracking activity and which are active for double bond isomerization at conditions suitable for reacting the hydrocarbons over the disproportionation catalyst. Some examples of suitable isomerization catalysts include magnesium oxide, phosphoric acid, bauxite, alumina-supported cobalt oxide, iron oxide or magnesium oxide, and the like. Suitable catalysts can be selected from among those available in the art.

When using magnesium oxide, the isomerization can be accomplished at temperatures ranging from about 50 to about 1100° F., preferably about 300 to about 900° F., at any suitable pressure and a residence times or throughput rates which will effect the desired degree of isomerization.

Any conventional contacting technique can be used for the isomerization step. This includes fixed bed operation, fluidized bed operation, suspended catalyst system, and the like, depending upon which technique is most suitable for the olefin being converted and the operation in general. Either liquid phase or gas phase can be carried out. The isomerization stage can be relatively remote from or closely integrated with the reaction steps wherein the olefins are contacted with the disproportionation catalyst.

Magnesium oxides suitable for use in the isomerization step can be any suitably activated material known in the art. This material normally has a surface area of at least one m.$^2$/g. The magnesia can be obtained from a naturally occurring material, such as the mineral Brucite, or can be synthetically prepared by suitable techniques. Minor amounts of other materials such as silica, alumina, and the like can be present, but the material is preferably principally magnesium oxide. Depending upon the contacting technique used for the isomerization, the activated magnesia can be in the form of pellets, extrudates, agglomerates, or even a fine powder. Before use in the process, the magnesium oxide is activated in a suitable manner such as by heating in a flowing stream of an oxygen-containing gas for about 1 to 30 hours at 500 to about 1500° F., preferably 600 to about 1100° F. After activation sometimes it is advisable to flush the catalyst with an inert gas to remove any absorbed oxygen or other gases from the magnesia. The regeneration of spent magnesia isomerization catalyst is usually accomplished by a technique which is similar to the activation of this material.

The catalysts which are useful for the present invention are those which have activity for the disproportionation of propylene into ethylene and butenes. Some examples of such catalysts are (1) Silica or thoria promoted by an oxide or compound convertible to an oxide by calcination or sulfide of tungsten or molybdenum or by an oxide or compound convertible to an oxide by calcination of rhenium, vanadium, niobium, tellurium or tantalum;

(2) Alumina promoted with an oxide or compound convertible to an oxide by calcination of molybdenum, tungsten, or rhenium; a sulfide of tungsten or molybdenum; or an alkali metal salt, ammonium salt, alkaline earth metal salt, or bismuth salt of phosphomolybdic acid;

(3) One or more of the group zirconia, aluminum phosphate, zirconium phosphate, calcium phosphate, magnesium phosphate, or titanium phosphate promoted by one or more of a sulfide of molybdenum or tungsten, or an oxide or compound convertible to an oxide by calcination of molybdenum, tungsten, vanadium, niobium, tantalum or rhenium or magnesium tungstate or beryllium phosphotungstate; and (4) Silica, alumina, zirconia, aluminum phosphate, zirconium phosphate, calcium phosphate, magnesium phosphate, or titanium phosphate promoted by a hexacarbonyl of molybdenum or tungsten.

The catalysts of (1) can be prepared and activated by conventional techniques such as by combining a catalyst grade silica with suitable tungsten, molybdenum, rhenium, vanadium, niobium, tellurium, or tantalum compounds by a conventional method such as, for example, impregnation, dry mixing, or coprecipitation. Suitable tungsten and molybdenum compounds include tungsten oxide and molybdenum oxide and compounds convertible to these oxides. The supported oxides are activated by calcining in air and the supported sulfides are activated by heating in an inert atmosphere.

The catalysts of (2) can be prepared and activated by conventional techniques such as by combining catalyst grade alumina with an oxide or a compound convertible to an oxide by calcination of molybdenum, tungsten or rhenium and calcining the resulting mixture after removal of any solvent used in the impregnation. The sulfides of tungsten or molybdenum or the salts of phosphomolybdic acid can be utilized to impregnate a catalyst grade alumina by solution in a proper solvent after which the solvent is evaporated and the resulting mixture dried to prepare the catalyst.

The catalyst compositions of (3) can be prepared and activated by conventional techniques. For example, molybdenum oxide can be coprecipitated with aluminum phosphate followed by calcination in air to produce an activated catalyst. Alternatively, the support material, such as zirconia, can be impregnated with a compound of the promoter convertible to the oxide, such as ammonium tungstate, followed by calcination in air. In the preparation of a sulfide-containing catalyst, a sulfide of the promoter can be ball-milled with a support, such as zirconium phosphate, followed by heating in an inert atmosphere such as nitrogen. Magnesium tungstate and beryllium phosphotungstate can be dry mixed with titanium phosphate, for example, and activated by calcination in the air at elevated temperatures.

The catalyst compositions of (4) can be prepared and activated by impregnating a previously calcined support material such as calcium phosphate with a solution of the hexacarbonyl of the promoter in an organic solvent such as benzene, followed by drying in a vacuum or in an inert atmosphere at about 50 to 700° F.

The catalytic agent is considered to be the reaction product resulting from the admixture of the support material and the promoter material which is subjected to activation treatment.

The operating temperature for the process of this invention when using catalysts of (1) is in the range of about 400 to 1100° F. The process of this invention when using the catalysts of (2) will be operated at a temperature in the range of about 150 to 500° F. The process using the catalysts of (3) will be carried out at a temperature of about 600 to 1200° F. The process using the catalysts of (4) will be carried out at a temperature of about 0 to 600° F. In the process of the invention, pressures are not important but will be in the range of about 0 to 2,000 p.s.i.g.

Other catalysts include those disclosed in Ser. No. 412,343 filed Nov. 19, 1964; now U.S. Pat. 3,395,196; Ser. No. 517,918 filed Jan. 3, 1966, now U.S. Pat. 3,442,969; Ser. No. 517,905 filed Jan. 3, 1966, now U.S. Pat. 3,444,262; Ser. No. 421,692 filed Dec. 28, 1964, now U.S. Pat. 3,418,390; Ser. No. 529,230 filed Feb. 23, 1966 and now abandoned; Ser. No. 516,673 filed Dec. 27, 1965; and U.S. Pat. 3,261,879 issued July 19, 1966.

The preferred catalysts are those which are used at relatively high temperatures such as those of the groups (1) and (3). A particularly preferred catalyst is tungsten oxide supported on silica.

It is sometimes advantageous to treat the catalyst with an inorganic base. Such inorganic base can be an alkali metal compound or an alkaline earth metal compound such as the oxides, hydroxides, carbonates, nitrates, acetates, sulfates, or halides of an alkali metal or an alkaline earth metal. Suitable metal compounds include the oxides, hydroxides, carbonates, bicarbonates, sulfates, halides, nitrates, acetates, and the like of lithium, sodium, potassium, rubidium, cesium, calcium, strontium, or barium.

Sodium hydroxide, potassium hydroxide, sodium carbonate, potassium chloride, barium hydroxide, and cesium hydroxide are representative of the applicable compounds useful in treating the catalysts. The alkali metal or alkaline earth metal compound can be incorporated into the catalyst composition advantageously by impregnating the catalyst with an aqueous solution of a suitable alkali or alkaline earth metal compound after which the water is evaporated and the catalyst calcined by the conventional activation treatment.

Although the olefin reaction of this invention is essentially independent of pressure, for most economical operation considering combination with the other steps in the operation including, for example, product separation and recovery, a pressure range of about 200–600 p.s.i.g. can used conveniently.

With a fixed bed reactor and continuous flow operation weight hourly space velocities in the range of about 0.5 to 1000 are suitable, with excellent results having been obtained in the range of about 1 to 200.

In the drawing, the reaction of a mixture of isobutene and butene-1 will be described for the production of 3-methylbutene-1. A mixture of isobutene and butene-1 is passed via conduit 12 to a first olefin reaction reactor indicated as unit 1. Fresh feed is introduced via conduit 10 and four-carbon atom olefinic materials are recycled via conduit 11. Unit 1 is a reactor containing therein a solid catalyst active for the disproportionation of propylene into ethylene and butene. The effluent from unit 1 is passed to separation zone 1 which can conveniently be one or more distillation columns to separate the effluent from unit 1 which comprises unreacted butenes, ethylene, and methylpentenes. The unreacted butenes are recycled to unit 1 via conduits 15 and 11, the ethylene is sent to unit 3, and the methylpentenes are passed to an isomerization reactor indicated as unit 2 via conduit 16. Unit 2 is a reactor containing therein a catalyst active for isomerization, for example, magnesium oxide. In unit 2, the methylpentenes are isomerized to approximately an equilibrium mixture of 2-methylpentene-1; 2-methylpentene-2; 4-methylpentene-1; and 4-methylpentene-2. The effluent from unit 2 is passed to a second olefin reaction reactor containing therein a catalyst active for the disproportionation of propylene indicated as unit 3 via conduits 18 and 22. Ethylene from unit 1 joins the stream of isomerization unit effluent via conduits 14 and 22. The molar ratio of ethylene to methylpentenes will usually be about 1:1 but can be as high as about 20:1. It may be sometimes desirable to augment the ethylene obtained from unit 1 with ethylene obtained from another source and introduced via conduit 22a. In unit 3 ethylene and 4-methylpentene-2 are converted to 3-methylbutene-1. The effluent from the reactor indicated as unit 3 is passed via conduit 23 to a separations zone 2 which can be one or more distillation columns. The effluent from unit 3 will contain methylpentenes, butenes, ethylene, propylene, and pentenes including 3-methylbutene-1 which is recovered as the product via conduit 26. Propylene is recovered as a by-product via conduit 25. Ethylene is returned to unit 3 via conduits 21 and 22. Butenes are returned to unit 1 via conduits 24, 11, and 12 and unconverted methylpentenes and other pentenes are returned to unit 2 via conduit 19.

When the feed to the process is a mixture of isobutene and butadiene-1,3, the steps are substantially the same. However, in unit 2 methylpentadienes will be produced instead of methylpentenes. The pentadienes produced in unit 1 will be isomerized in unit 2 to produce a substantially equilibrium mixture of 4-methylpentadiene-1,3; 2-methylpentadiene-1,4; and 2-methylpentadiene-1,3. In unit 3, 2-methylpentadiene-1,3 and ethylene are converted in the presence of a catalyst active for the disproportionation of propylene to produce isoprene and propylene.

It is desirable that the mixture of olefinic hydrocarbons utilized as feed be substantially equimolar; however, this is not essential because almost any ratio of the two olefinic hydrocarbons can be utilized.

The following specific embodiments will be helpful in attaining an understanding of the invention but should be considered as exemplary and should not be construed as to limit unduly the claims.

EXAMPLE I

In a typical operation for the preparation of 3-methylbutene-1, the feed is isobutene and butene-1, the catalyst in unit 1 is composed of about 8 weight percent tungsten oxide and 92 weight percent silica and this catalyst will be base treated to contain about 0.14 weight percent sodium. The catalyst in unit 2 will be magnesium oxide and the catalyst in unit 3 will be the same as in unit 1 except the base treatment will be omitted. The temperature in units 1, 2, and 3 will be about 800° F.; the pressure in units 1 and 2 will be about 300 p.s.i.g. and in unit 3 will be about 100 p.s.i.g. The space velocity in parts by weight of feed per part by weight of catalyst per hour for unit 1 will be about 50; in unit 2 will be about 30; and in unit 3 will be about 35.

A material balance for the process in the form of a stream analysis for each of the principal streams involved in the process is shown in Table I. The stream analyses are in terms of part by weight per hour.

TABLE I.—PRODUCTION OF 3-METHYLBUTENE-1

| Stream Number | Parts by weight per hour of— | | | | | | | | | | | | | | |
|---|---|---|---|---|---|---|---|---|---|---|---|---|---|---|---|
| | 10 | 11 | 12 | 13 | 14 | 15 | 16 | 19 | 17 | 18 | 21 | 22 | 23 | 24 | 25 | 26 |
| Component: | | | | | | | | | | | | | | | | |
| Ethylene | | | | 120 | 120 | | | | | | 285 | 405 | 288 | | 3 | |
| Propylene | | 2 | 2 | 16 | 15 | 1 | | | | | 10 | 25 | 93 | 1 | 82 | |
| Isobutene | 120 | 580 | 700 | 461 | | 461 | | | | | | | 120 | 119 | 1 | |
| Butene-1 | 120 | 170 | 290 | 51 | | 51 | | | | | | | 120 | 119 | 1 | |
| Butene-2 | | 8 | 8 | 7 | | 7 | | | | | | | 1 | 1 | | |
| 3-methylbutene-1 | | | | 41 | | | 41 | 24 | 65 | 65 | | | 165 | | | 150 |
| Other methylbutenes | | | | 41 | | | 41 | 24 | 65 | 65 | | | 12 | | | 3 |
| 4-methylpentene-2 | | | | 300 | | | 300 | 640 | 940 | 195 | | | 640 | | | |
| Other methylpentenes | | | | 300 | | | 300 | 640 | 940 | 745 | | | 640 | | | |
| Heptenes plus | | | | 4 | | | 4 | 1 | 5 | 5 | | | 1 | | | |
| Total | 240 | 760 | 1,000 | 1,000 | 135 | 520 | 345 | 665 | 1,010 | 1,010 | 295 | 430 | 1,440 | 240 | 87 | 153 |

EXAMPLE II

In a typical process for the production of isoprene the feed will be isobutene and butadiene-1,3 and the catalysts of units 1, 2, and 3 will be the same as Example I. The temperature in unit 1 will be about 1000° F.; in unit 2 will be about 800° F., and in unit 3 will be about 900° F. The pressure in units 1 and 2 will be about atmospheric and in unit 3 will be about 50 p.s.i.g. The space velocity in parts by weight of feed per part by weight of catalyst per hour will be about 10 in each of units 1, 2, and 3.

A material balance for the process in the form of stream analyses for each of the principal streams involved is shown in Table II. The analyses for each of the principal streams involved is shown in Table II. The stream analyses are in terms of parts by weight per hour.

TABLE II.—PRODUCTION OF ISOPRENE

| | Parts by weight per hour of— | | | | | | | | | | | | | | | |
|---|---|---|---|---|---|---|---|---|---|---|---|---|---|---|---|---|
| Stream Number | 10 | 11 | 12 | 13 | 16 | 14 | 15 | 17 | 18 | 22 | 23 | 21 | 25 | 26 | 19 | 24 |
| Component: | | | | | | | | | | | | | | | | |
| Ethylene | | | | 25 | | 25 | | | | 250 | 225 | 225 | | | | |
| Propylene | | | | | | | | | | | 30 | | 30 | | | 10 |
| Isobutene | 40 | 480 | 520 | 470 | | 470 | | | | | 10 | | | | | 10 |
| Butadiene-1,3 | 40 | 480 | 520 | 470 | | 470 | | | | | 10 | | | | | 10 |
| 4-methylpentadiene-1,3 | | | | 75 | 75 | | | 130 | 70 | | 55 | | | | 55 | |
| 2-methylpentadiene-1,4 | | | | | | | | 55 | 55 | | 55 | | | | 55 | |
| 2-methylpentadiene-1,3 | | | | | | | | 30 | 90 | | 30 | | | | 30 | |
| Isoprene | | | | | | | | | | | 50 | | | 50 | | |
| Total | 80 | 960 | 1,040 | 1,040 | 75 | 25 | 940 | 215 | 215 | 250 | 465 | 225 | 30 | 50 | 140 | 20 |

The above examples illustrate that a unitary process has been provided for the production of 3-methylbutene-1 or isoprene which is simple, efficient, and economical.

The polymerizable 3-methylbutene-1 is known to be a valuable raw material for the production of fibers and solid polymers. The present invention provides a novel, continuous process for making this material from isobutene and butene-1. The preparation of 3-methylbutene-1 monomer is particularly advantageous according to the present invention because isobutene and butene-1 are often present in refinery streams as mixtures which cannot be easily separated from each other by fractionation. The use of such mixtures as feed to the present process is convenient and economical.

Isoprene is a valuable raw material for the production of synthetic rubber. The present invention provides a novel, continuous process for making this material from a mixture of butadiene and isobutene each of which is readily available and often as a mixture.

That which is claimed is:

1. A process for converting a mixture comprising isobutylene and butene-1 or butadiene-1,3 to product propylene and 3-methylbutene-1 when the mixture comprises said butene-1 or to produce propylene and isoprene when the mixture comprises butadiene-1,3- comprising the steps of:
   (1) contacting the mixture in a first step with a catalyst active for disproportionating propylene into ethylene and butene, under conditions including conditions of temperature, pressure and contact time suitable to produce an olefinic hydrocarbon having six carbon atoms per molecule, said olefinic hydrocarbon being methylpentene, when the mixture comprises butene-1, or methylpentadiene, when the mixture comprises butadiene-1,3;
   (2) contacting the olefinic hydrocarbon containing six carbon atoms in a second step with a double bond isomerization catalyst under conditions including conditions of temperature, pressure and contact time suitable to produce a mixture of double bond isomers, said mixture of isomers comprising 4-methylpentene-2, when the feed comprises butene-1, or 2-methylpentadiene-1,3, when the feed comprises butadiene-1,3; and
   (3) contacting the mixture of isomers in a third step with ethylene and a catalyst active for disproportionating propylene into ethylene and butene, under conditions including conditions of temperature, pressure and contact time suitable to produce said propylene and said 3-methylbutene-1 or said isoprene.

2. The process according to claim 1 wherein the mixture comprises isobutylene and butene-1, said hydrocarbon having six carbon atoms per molecule is methylpentene, said mixture of double bond isomers comprises 4-methylpentene-2 and the product is 3-methylbutene-1.

3. A process according to claim 1 wherein the mixture comprises isobutylene and butadiene-1,3, said olefinic hydrocarbon having six carbon atoms per molecule is methylpentadiene, said mixture of double bond isomers comprises 2-methylpentadiene-1,3 and the product is isoprene.

4. The process of claim 1 wherein ethylene produced in the first step is utilized in the third step.

5. The process of claim 1 wherein the catalyst of the first step and the catalyst of the third step are selected from the group consisting of:
   (1) silica or thoria promoted by an oxide or compound convertible to an oxide by calcination or sulfide of tungsten or molybdenum or by an oxide or compound convertible to an oxide by calcination of rhenium, vanadium, niobium, tellurium or tantalum;
   (2) alumina promoted with an oxide or compound convertible to an oxide by calcination of molybdenum, tungsten, or rhenium; a sulfide of tungsten or molybdenum; or an alkali metal salt, ammonium salt, alkaline earth metal salt, or bismuth salt of phosphomolybdic acid;
   (3) one or more of zirconia, aluminum phosphate, zirconium phosphate, calcium phosphate, magnesium phosphate, or titanium phosphate promoted by one or more of a sulfide of molybdenum or tungsten, or an oxide or compound convertible to an oxide by calcination of molybdenum, tungsten, vanadium, niobium, tantalum or rhenium or magnesium tungstate or beryllium phosphotungstate; and
   (4) silica, alumina, zirconia, aluminum phosphate, zirconium phosphate, calcium phosphate, magnesium phosphate, or titanium phosphate promoted by a hexacarbonyl of molybdenum or tungsten.

6. The process of claim 1 wherein the catalyst of the first step and the catalyst of the second step comprise silica promoted with tungsten oxide.

References Cited
UNITED STATES PATENTS

| | | | |
|---|---|---|---|
| 3,296,330 | 1/1967 | Sherk | 260—683 |
| 3,457,320 | 7/1969 | Stapp et al. | 260—683 |
| 3,526,676 | 9/1970 | Turner et al. | 260—683 |

FOREIGN PATENTS

| | | | |
|---|---|---|---|
| 1,159,053 | 7/1969 | Great Britain | 260—683 |
| 1,159,056 | 7/1969 | Great Britain | 260—683 |

PAUL M. COUGHLAN, JR., Primary Examiner

U.S. Cl. X.R.

260—683 D, 683.2